(12) United States Patent
Paquette (10) Patent No.: US 7,818,755 B1
(45) Date of Patent: Oct. 19, 2010

(54) WINDOW SERVER EVENT TAPS

(75) Inventor: Michael James Paquette, Benicia, CA (US)

(73) Assignee: Apple Inc., Cupertino, CA (US)

( * ) Notice: Subject to any disclaimer, the term of this patent is extended or adjusted under 35 U.S.C. 154(b) by 1112 days.

(21) Appl. No.: 11/020,875

(22) Filed: Dec. 22, 2004

(51) Int. Cl.
*G06F 13/00* (2006.01)
*G06F 3/00* (2006.01)

(52) U.S. Cl. .................. 719/318; 719/328; 715/762

(58) Field of Classification Search .......... 719/318, 719/328; 709/228; 463/36, 37; 345/156, 345/157, 161, 163, 167, 168; 715/762
See application file for complete search history.

(56) References Cited

U.S. PATENT DOCUMENTS

| | | | |
|---|---|---|---|
| 5,490,247 A * | 2/1996 | Tung et al. | 345/501 |
| 5,838,969 A | 11/1998 | Jacklin et al. | |
| 5,862,395 A | 1/1999 | Bier | |
| 5,911,068 A | 6/1999 | Zimmerman et al. | |
| 6,108,700 A * | 8/2000 | Maccabee et al. | 709/224 |
| 6,213,880 B1 | 4/2001 | Sim | 463/37 |
| 6,633,313 B1 | 10/2003 | Cirne et al. | |
| 6,647,432 B1 * | 11/2003 | Ahmed et al. | 719/318 |
| 6,908,391 B2 * | 6/2005 | Gatto et al. | 463/42 |
| 7,171,018 B2 * | 1/2007 | Rhoads et al. | 382/100 |
| 7,209,250 B2 * | 4/2007 | Nakao | 358/1.15 |
| 7,434,167 B2 * | 10/2008 | Sinclair et al. | 715/744 |
| 7,451,453 B1 * | 11/2008 | Evans et al. | 719/318 |
| 2003/0065647 A1 * | 4/2003 | Satomi et al. | 707/1 |
| 2005/0005243 A1 | 1/2005 | Olander et al. | |

OTHER PUBLICATIONS

Devx, "Event Handling", Wrox Press Limited, 1999, p. 1-3.*
"SetWinEventHook," MSDN Library at msdn.microsoft.com/library, Printed Nov. 19, 2004 (2 pages).
"Event Constants,"MSDN Librafy at msdn.microsoft.com/library, Printed Nov. 19, 2004 (5 pages).
"Technical Note TN 1060—Controlling Apps with Synthesized Events, or jGNEFilter—the Untold Story," Jan. 18, 2000, Technote 1060: jGNEFilters—the Untold Story.
"SGI TPL View (xscope)," techpubs.sgi.com/library, Printed Nov. 19, 2004 (6 pages).
"Kenton Lee: Debugging X Window System Input Events," rahul.net/kenton/events.html, Printed Nov. 19, 2004 (8 pages).

* cited by examiner

*Primary Examiner*—Lechi Truong
*Assistant Examiner*—Phuong N Hoang
(74) *Attorney, Agent, or Firm*—Wong, Cabello, Lutsch, Rutherford & Brucculeri LLP (57) ABSTRACT

Methods, devices and an associated application programming interface are described that permits a user to register event tap routines ("ETRs") with an application such as, for example, a window server application. Event tap routines permit events such as human interface device events to be processed at multiple points and in a manner not provided during normal window server operations. Event tap routines may effect passive or active event responses. Passive ETRs may merely record the occurrence of an event or the time between successive events without modifying or altering the event's processing sequence within a window server. Active ETRs, on the other hand, effect some programmatic response to an event. For example, active ETRs may modify the state of an event, delete the event, create one or more additional events or cause the event to be processed "out of sequence" by the window server application.

11 Claims, 3 Drawing Sheets

WINDOW SERVER EVENT TAPS

BACKGROUND

The invention relates generally to graphically-oriented computer operating systems and more particularly, but not by way of limitation, to a method and system for processing events in general and human interface device events in particular.

Most modern computer systems employ operating systems that support graphical user interfaces. Central to these operating systems is the use of a low-level application referred to as a "window server." One function of a window server is to receive, annotate and route signals from external devices (e.g., human interface devices such as keyboards, pointer devices and tablets) to the appropriate application (e.g., an audio, video or multimedia application). It will be recognized that most modern operating systems treat signals generated by human interface devices as "events" which are typically embodied as data structures or objects. In accordance with this view, human interface devices generate input signals which are received by the operating system, converted to an event (ordinarily by a software routine referred to as a "device driver") and passed to the window server. The window server, in turn, associates each event with a given user or session through a series of processing steps and routes the event to the appropriate application.

This general architecture permits a software developer to customize an application's event-driven interaction with a user. In accordance with one prior art approach, for example, a developer may use an Application Programming Interface ("API") to obtain access to events immediately prior to their being delivered to a specified application. Event receipt may be used to trigger execution of a developer-specified routine to effect the desired (i.e., modified) human interface device response. In accordance with another prior art approach, all events sent to a window server may be intercepted and processed in accordance with customized developer routines to identify and extract those events for which specialized processing is desired.

One drawback to the former approach is that it limits event response customization to unique/specified applications. One drawback to the latter approach is that it requires developers to develop custom software to receive and identify those events they wish to process and, further, to ensure that those events are subsequently sent to the operating system's window server for conventional processing. Another drawback to the latter approach is that it requires all applications executing in such an environment to communicate with the customized event screening software rather the standard window server application.

Thus, it would be beneficial to provide a means for responding to human interface device events as they are processed by a window server—on receipt (input), immediately prior to being routed to the appropriate application (output) and at processing points within the window server between its input and output.

SUMMARY

The invention provides a method to process user interface events through the use of event tap routines ("ETRs"). As used herein, an "event tap routine" is a procedure that is invoked by one or more of a plurality of points during event processing by a controlling application such as, for example, a window server application. Event tap routines may effect passive or active event responses. Passive ETRs may record the occurrence of an event or the time between successive events without modifying or altering the event's processing sequence within a window server. Active ETRs may be used to effect some programmatic response to an event. In one embodiment, the invention provides a method that includes receiving a user interface event from an operating system, identifying the user interface event as belonging to at least one of a plurality of registered user interface event types, determining the user interface event is associated with an event processing routine, causing the event processing routine to process the user interface event and receiving a result from the user-level event processing routine. Methods in accordance with the invention may be stored in any media that is readable and executable by a computer system.

In another embodiment, the invention provides a user interface event application programming interface (API) including a function allowing a user to register an event processing routine at a specified one of a plurality of user interface event taps within a window server application, wherein the registered event processing routine is associated with a specified user interface event type and is invoked when an event of the associated type is received by the window server application at the specified tap.

DETAILED DESCRIPTION

Methods and devices to process human interface device events 100 are described. In the disclosed embodiments (see FIG. 1), applications 105 utilize application programming interface ("API") 110 to register event tap routines ("ETR") 115 with window server application 120. Event tap routines 115 permit events 100 to be processed at multiple points (e.g., tap-1 to tap-N) and in a manner not provided during normal window server operations 125. Event tap routines (which may also be referred to as event filter routines) are separate from and not necessarily associated with the application to which the event is targeted. Illustrative applications 105 include, but are not limited to, user-level applications such as audio, video and multimedia applications—each of which may present one or more windows to the user. Illustrative human interface devices include, but are not limited to, pointer devices (e.g., a mouse, trackpad, trackball and joystick), keyboards, control devices (e.g., a front panel knob, switch, slider or button or a game's data glove, throttle or steering wheel) and display devices. As used herein, events are user actions initiated through one or more human interface devices.

Figure 1:
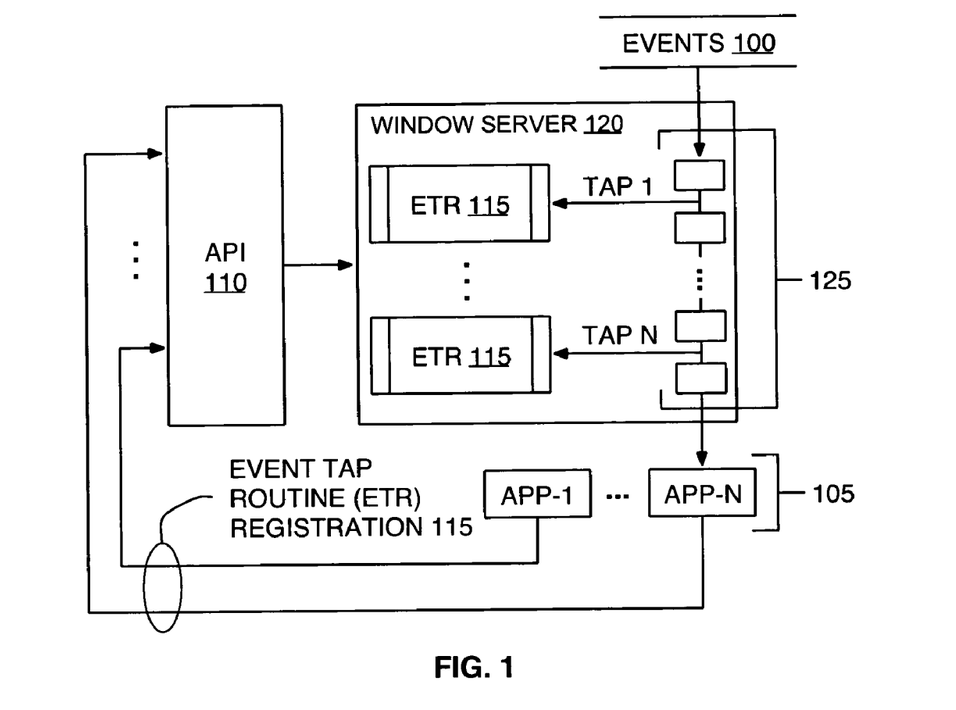
FIG. 1 shows, in block diagram form, a graphical user interface oriented computational environment in accordance with one embodiment of the invention.

Event processing in accordance with the invention may be passive or active. Passive ETRs may, for example, merely record the occurrence of an event or the time between successive events without modifying or altering the event's processing sequence (e.g., 125) within window server 120. Active ETRs, on the other hand, effect some programmatic response to an event. For example, active ETRs may be used to effect human interface device event responses that conform to Section 508 of the Rehabilitation Act of 1973 (see 29 U.S.C. 794), a primary purpose of which is to ensure that electronic and information technology equipment purchased by Federal agencies is accessible to, and usable by, individuals with disabilities. Active ETRs in accordance with the invention may also change an event's type, alter the processing sequence of an event by window server 120, delete an event so that further processing of the event by window server 120 is halted, or generate one or more additional events that are then processed by window server 120.

The following descriptions are presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

As noted above, ETRs are registered with window server 120 through API 110, one embodiment of which is defined in the section entitled "Illustrative API" of this disclosure. Registration permits a user to specify an ETR that is to be performed at one or more of a plurality of points ("taps") during window server human interface device ("HID") event processing. When an ETR registers, it identifies one or more events to be observed, an action to be performed (e.g., a routine or function to execute) and indicates whether the ETR is passive or active. In one embodiment, routines may be designated to run when an event is (1) received and accepted by window server 120—a HID type event, (2) prior to being associated with a specific session or user—a session type event, (3) after being associated with a specific session or user—an annotated session type event and/or (4) immediately prior to being routed to a target application—a connection type event.

Figure 2:
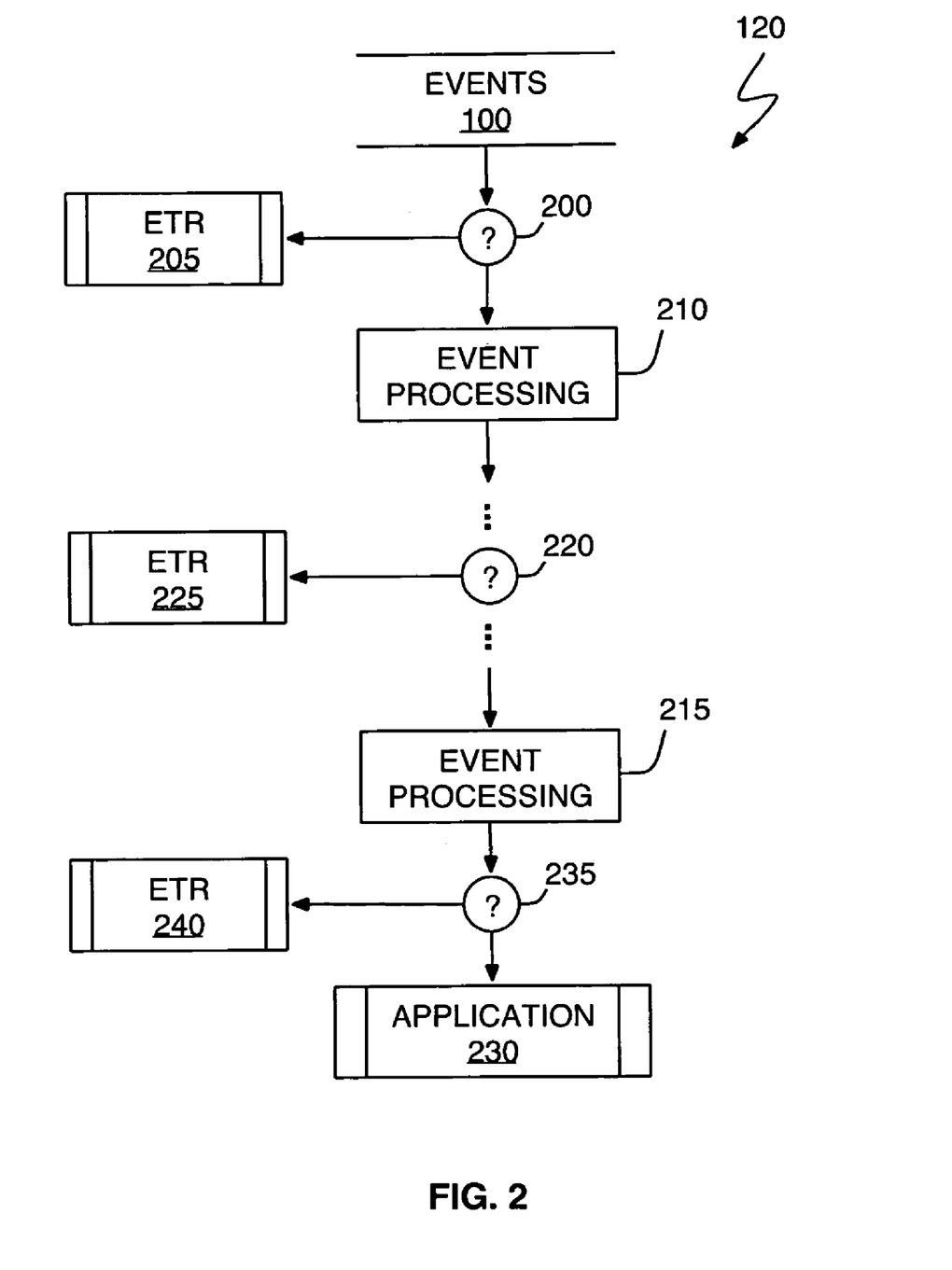
FIG. 2 shows, in flowchart form, the general operation of a window server application in accordance with the invention.

Referring to FIG. 2, the general operation of window server 120 in accordance with the invention is illustrated. As events 100 are received by window server 120 a first check 200 is performed to determine if the event is associated with a registered HID event type. If it is, HID ETR 205 is performed. During continued window server event processing (blocks 210 through 215), one or more additional checks 220 may be made and additional ETRs executed (block 225). Prior to routing an event to its targeted application/window 230, a final check 235 may be made to cause application and/or window specific processing to occur via ETR 240. One of ordinary skill in the art will recognize that the multiple-event-tap architecture of FIG. 2 is applicable to not only the operation of window server 120, but also to messages transmitted between various applications—operating system or user-level applications. In a MAC Os® environment, for example, events may be generated by one application and sent to another application by way of Apple events using AppleScript. (AppleScript® is a registered trademark of Apple Computer, Inc. of Cupertino, Calif.)

Figure 3:
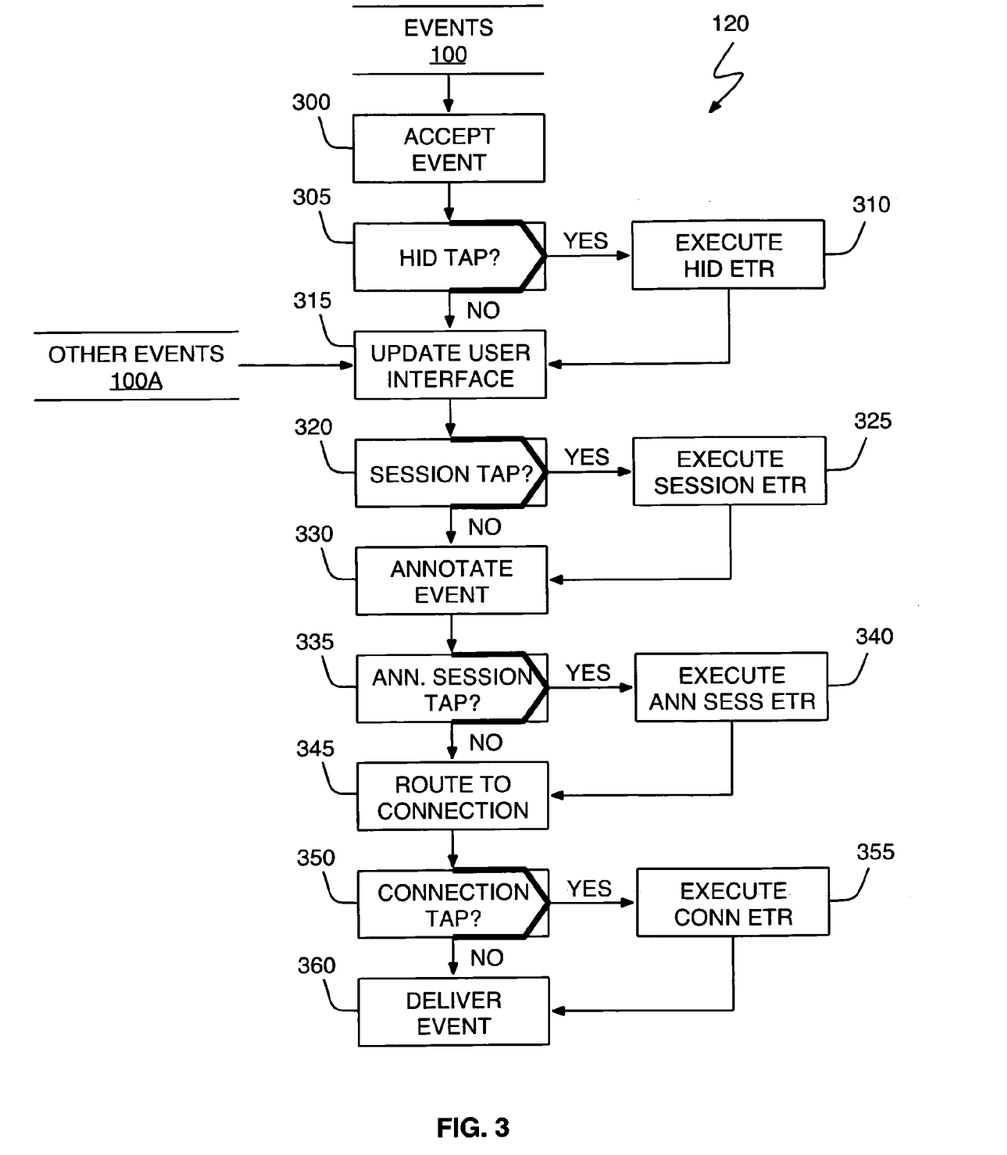
FIG. 3 shows, in flowchart form, the operation of a window server application in accordance with one embodiment of the invention.

A specific embodiment of window server 120 as designed and implemented for the MAC OS® X operating system is illustrated-in FIG. 3. (MAC OS is a registered trademark of Apple Computer, Inc. of Cupertino, Calif.) As events 100 are received, each is time-stamped and checked to determine if it is consistent with the current state of the computer system—that is, not spurious (block 300). Illustrative HID events 100 include, but are not limited to, keystrokes, mouse movements and/or clicks, trackpad movements and/or clicks, tablet events, scroll wheel actions, computer system power switch activation, suspend and resume actions associated with a specific application and/or process, computer system sleep and wake events, display brightness changes, volume control changes and timer activations. That is, substantially any user interface input event.

A check is then made to determine if at least one HID type event ETR has been registered with window server 120 (block 305). If a HID ETR has been registered (the "YES" prong of block 305), the appropriate HID ETR is invoked (block 310). HID ETR 310 represents one or more registered ETRs, each of which may have its own callback routine to effect its desired action. In one embodiment, each event is presented to the registered ETR as an opaque object, referenced by a number of keys, to return an appropriate value. If an ETR's callback routine fails to return cleanly, the ETR associated with the callback function is disabled. This can happen, for example, if the callback function raises an exception rather than returning. (The affected application may re-establish an event tap after a timeout period has expired.) On completion of the one or more HID ETRs (block 310) or in the event no HID type ETR has been registered (the "NO" prong of block 305), the overall state of the user interface is updated (block 315). Acts in accordance with block 315 include, for example, moving the displayed cursor's position or presentation and updating the state of any user interface element (e.g., windows and applications). In some operating systems, HID events 100A from, for example, tablets are input to window server 120 at block 315. Once admitted to window server 120, events 100A may be processed in accordance with any remaining event tap check (e.g., at blocks 320, 335, and/or 350).

Next, a check is made to determine if at least one session type event ETR has been registered with window server 120 (block 320). If a session ETR has been registered (the "YES" prong of block 320), the appropriate session ETR is invoked (block 325). It will be recognized that a "session" is that collection of applications and processes associated with a single user login. Following the acts of block 325 or when no session type event ETR has been registered (the "NO" prong of block 320), the current event object is annotated to, for example, identify the window and connection (e.g., owner/application) associated with the event (block 330). A check is then made to determine if at least one annotated session type event ETR has been registered with window server 120 (block 335). If an annotated session ETR has been registered (the "YES" prong of block 335), the appropriate annotated session ETR is invoked (block 340). Following the acts of block 340 or when no annotated session type event ETR has been registered (the "NO" prong of block 335), the current event object is routed to its associated connection (block 345). If at least one connection type event ETR has been registered with window server 120 (the "YES" prong of block 350), the appropriate connection ETR is invoked (block 355). Following the acts of block 355 or when no connection type event ETR has been registered (the "NO" prong of block 350), the current event object is delivered to its application/process (block 360).

In one embodiment, when an event is passed to an ETR, window server 120 continues to be responsive to remote procedure calls. In addition, the ordering of events is maintained. That is, events not being filtered (events processed via the "NO" prongs of blocks 305, 320, 335 or 350) are not permitted to pass earlier events which are being filtered (events processed via the "YES" prongs of blocks 305, 320, 335 or 350).

As noted above and detailed in the section Illustrative API, each ETR may be passive or active. If the ETR is passive, it does not generate any side-effects. If the ETR is active, its callback routine may be used to effect any desired action. For example, active ETRs may pass an event back to window server 120 unmodified (e.g., at 315, 330, 345 or 360), modify an event, discard an event or create one or more additional events that are inserted in window server processing at any specified tap point (e.g., at 305, 320, 335 and/or 350).

For security reasons, in one embodiment keyboard events are not routed to any event tap other than the HID type tap (block 310) when secure text input is active. It will be recognized that "secure input" is a mode of operation that prevents a program from reading the text input or keyboard events which are directed to the "foreground" or currently active program. Secure text input is typically used for entering passwords and similar sensitive data that other programs should not see. In addition, a notification of secure input being active may be posted through, for example, an API. For the same reasons, if an ETR modifies an event so as to make it a keyboard event, that event will not be passed to any further taps on it's way to its associated application while secure text input is active. It will be recognized that HID type ETRs or taps (see block 310) have access to events from all sessions and for all users. Thus, some embodiments may restrict the registration of HID type ETRs to the super-user or administrator (e.g., the "root" user). In contrast, session taps (e.g., blocks 325, 340 and 355) process events for only a specific user. Accordingly, registered ETRs for these event types may be placed under the same security constraints as the session owner. In another embodiment, an emergency override key sequence not likely to be encountered by accident is provided to disable all active taps. This will allow a user to regain control over a window server in which an ETR has disrupted normal event flow.

One benefit of the invention is that it provides a user with the ability to customize an application's response to a human interface device event at multiple locations within a window server's processing scheme. Another benefit of the invention is that it provides an easy to use API to facilitate the registration and revocation of ETRs. Yet another benefit of the invention is that device event response can be passive or active, where an active response can include the modification or deletion of the triggering event or the creation of one or more additional events. Still another benefit of the invention is that techniques in accordance therewith allows the addition of system-wide behaviors in response to input events. Such behaviors may be added by a third party (e.g., software vendor) without modifying the operating system or the operating system's window server application. Modified system-wide behaviors may include support for novel user input methods or the addition of specialized feedback in response to input events, such as sound or tactile feedback, for example.

Various changes in the components and in the details of the illustrated operational methods are possible without departing from the scope of the following claims. For instance, the illustrative system of FIG. 1, window server 120 is illustrated as being a monolithic application. This is not necessary. In addition, acts in accordance with FIG. 2 may or may not incorporate the ability to receive events from external devices such as, for example, tablets (denoted as element 100A in FIG. 1). Further, more than one event tap routine may be registered at any given tap location (e.g., 310, 325, 340 and 355 in FIG. 2) and that multiple tap routines at multiple tap locations may simultaneously be registered and active. It will also be recognized that acts in accordance with FIG. 2 may be embodied in computer software, that such software may execute at the kernel (protected), the user (unprotected) level or a combination of kernel and user levels within an operating system. For example, window server operations identified in FIG. 2 at elements 300, 315, 330, 345 and 360 may be performed by computer software executing at the kernel level while individual event tap routines (or, more precisely, ETR callback functions) may operate at the user level. In another embodiment, events 100 (see FIG. 2) may originate from an application other than the operating system or an external device. For example, one of ordinary skill in the art will recognize that Apple Events (and AppleScript®) may be created and sent by a first application to a second application.

It will also be recognized that computer programs may be executed by a programmable control device. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Illustrative API: The following illustrative embodiment of an Application Programming Interface ("API") in accordance with the invention is applicable to the Apple® OS X operating system. (Apple is a registered trademark of Apple Computer, Inc. of Cupertino, Calif.)

CGEventSource: The CGEventSource is an opaque representation of the source of an event. This API permits the user to obtain a CGEventSource from an event, and to create a new event with a CGEventSource. One typical usage would be to take the event source from an event entering the filter (ETR), and to use that source for any new events created as a result of the received event. This has the effect of marking the events as being related.

typedef struct_CGEventSource * CGEventSource;

CGEventRef: The CGEventRef object may be created or copied, retained, released, and modified. The object provides an opaque representation of one low level hardware (human interface device) event.

/* Return the CFTypeID for CGEventRefs. */
CG_EXTERN CFTypeID CGEventGetTypeID(void);

This API provides the ability to create a NULL event, or to create specialized events reflecting a state specified as parameters to the creation functions.

/* Create a NULL event to be filled in. 'source' may be NULL. */
CG_EXTERN CGEventRef CGEventCreate(CGEventSource source);
/*
* Create mouse events.
* The event source may be taken from another event, or may be
* NULL. mouseType should be one of the mouse event types.
* mouseCursorPosition should be the global coordinates the mouse
* is at for the event. For kCGEventOtherMouseDown,
* kCGEventOtherMouseDragged, and kCGEventOtherMouseUp events,
* the mouseButton parameter should indicate which button is
* changing state.
* The current implementation of the event system supports a

```
 * maximum of thirty-two buttons. Mouse button 0 is the
    primary
 * button on the mouse. Mouse button 1 is the secondary
 * mouse button (right). Mouse button 2 is the center button,
    and
 * the remaining buttons would be in USB device order.
 */
CG_EXTERN CGEventRef CGCreateMouseEvent(CGEv-
    entSource source,
    CGEventType mouseType,
    CGPoint mouseCursorPosition,
    CGButtonCount mouseButton);
/* Return the CFTypeID for CGEventRefs. */
CG_EXTERN CFTypeID CGEventGetTypeID(void);
    This API provides the ability to create a NULL event, or to
create specialized events reflecting a state specified as param-
eters to the creation functions.
/* Create a NULL event to be filled in. 'source' may be
    NULL. */
CG_EXTERN CGEventRef CGEventCreate(CGEvent-
    Source source);
/*
 * Create mouse events.
 * The event source may be taken from another event, or may
    be
 * NULL. mouseType should be one of the mouse event types.
 * mouseCursorPosition should be the global coordinates the
    mouse
 * is at for the event. For kCGEventOtherMouseDown,
 * kCGEventOtherMouseDragged, and kCGEventOtherMou-
    seUp events,
 * the mouseButton parameter should indicate which button is
 * changing state.
 * The current implementation of the event system supports a
 * maximum of thirty-two buttons. Mouse button 0 is the
    primary
 * button on the mouse. Mouse button 1 is the secondary
 * mouse button (right). Mouse button 2 is the center button,
    and
 * the remaining buttons would be in USB device order.
 */
CG_EXTERN CGEventRef CGCreateMouseEvent(CGEv-
    entSource source,
    CGEventType mouseType,
    CGPoint mouseCursorPosition,
    CGButtonCount mouseButton);
/*
 * Create keyboard events.
 * The event source may be taken from another event, or may
    be NULL.
 * Based on the virtual key code values entered,
 * the appropriate key down, key up, or flags changed events
    are
 * generated.
 * All keystrokes needed to generate a character must be
    entered,
 * including SHIFT, CONTROL, OPTION, and COMMAND
    keys. For example,
 * to produce a 'Z', the SHIFT key must be down, the 'z' key
    must go
 * down, and then the SHIFT and 'z' key must be released:
 * CGCreateKeyboardEvent((CGKeyCode)56, true); // shift
    down
 * CGCreateKeyboardEvent((CGKeyCode)6, true); // 'z'
    down
 * CGCreateKeyboardEvent((CGKeyCode)6, false); // 'z' up
 * CGCreateKeyboardEvent((CGKeyCode)56, false); // 'shift
    up
 */
CG_EXTERN CGEventRef CGCreateKeyboardEvent
    (CGEventSource source,
    CGKeyCode virtualKey,
    bool keyDown);
CG_EXTERN CGEventRef CGEventCopy(CGEventRef
    event);
    CFRetain( ) and CFRelease( ) may be used to retain and
release CGEventRefs. A set of type codes, accessor functions,
and data tags are defined to permit access and modification of
data within CGEventRefs.
    Event Type Codes: The following enumeration describes
all event types currently presented in this API.
/* Event types */
typedef enum {
/* mouse events */
    kCGEventLeftMouseDown=1, /* left mouse-down event
        */
    kCGEventLeftMouseUp=2, /* left mouse-up event */
    kCGEventRightMouseDown=3, /* right mouse-down
        event */
    kCGEventRightMouseUp=4, /* right mouse-up event */
    kCGEventMouseMoved=5, /* mouse-moved event */
    kCGEventLeftMouseDragged=6, /* left mouse-dragged
        event */
    kCGEventRightMouseDragged=7, /* right mouse-
        dragged event */
/* keyboard events */
    kCGEventKeyDown=10, /* key-down event
    kCGEventKeyUp=11, /* key-up event */
    kCGEventFlagsChanged=12, /* flags-changed (modifier
        */
    /*event keys)*/
/* Specialized control devices */
    kCGEventScrollWheel=22, /* Scroll wheel input device */
    kCGEventTabletPointer=23, /* specialized tablet pointer
        */
    /*event, in addition to */
    /* tablet mouse event */
    kCGEventTabletProximity=24, /* specialized tablet prox-
        */
    /* imity event, in addition */
    /* to tablet mouse event */
    kCGEventOtherMouseDown=25, /* Mouse button 2-31
        down */
    kCGEventOtherMouseUp=26, /* Mouse button 2-31 up */
    kCGEventOtherMouseDragged=27/* Drag with mouse
        button */
    /* 2-31 down */
}CGEventType;
    Tablet devices may generate mice events with embedded
tablet data, or tablet pointer and proximity events. The tablet
events as mouse events allow tablets to be used with programs
which are not tablet-aware.
    High Level Accessor Functions: The following functions
provide high level access to selected event data.
typedef uint64_t CGEventTimestamp;
typedef uint64_t CGEventFlags;
CGEventSource CGEventGetSource(CGEventRef event);
void CGEventSetSource(CGEventRef event, CGEvent-
    Source source);
CGEventType CGEventGetType(CGEventRef event);
void CGEventSetType(CGEventRef event, CGEventType
    type);
```

CGEventTimestamp CGEventGetTimestamp(CGEventRef event);
void CGEventSetTimestamp(CGEventRef event, CGEventTimestamp timestamp);
CGPoint CGEventGetLocation(CGEventRef event);
void CGEventSetLocation(CGEventRef event, CGPoint location);
CGEventFlags CGEventGetFlags(CGEventRef event);
void CGEventSetFlags(CGEventRef event, CGEventFlags flags);

Low Level Event Accessor Functions: Additional low level functions provide access to specialized fields of the events include the following.

intmax_t CGEventGetIntegerValueField(CGEventRef event, CGEventField field);
double CGEventGetDoubleValueField(CGEventRef event, CGEventField field);
CGPoint CGEventGetPointValueField(CGEventRef event, CGEventField field);
void CGEventSetIntegerValueField(CGEventRef event, CGEventField field,
    intmax_t value);
void CGEventSetDoubleValueField(CGEventRef event, CGEventField field, double value);
void CGEventSetPointValueField(CGEventRef event, CGEventField field, CGPoint point);

The CGEventSetPointValueField and CGEventGetPointValueField only works on fields capable of holding point data. The other functions work on any other field in the event record, performing the appropriate type conversions and range clamping automatically.

Low Level Event Accessor Keys: Additional keys and values found in mouse events, including the OtherMouse events include the following.

kCGMouseEventNumber
    Key associated with an integer encoding the mouse button event number as an integer. Matching mouse-down and mouse-up events will have the same event number.
kCGMouseEventClickState
    Key associated with an integer encoding the mouse button clickState as an integer. A clickState of 1 represents a single click. A clickState of 2 represents a double-click. A clickState of 3 represents a triple-click.
kCGMouseEventPressure
    Key associated with a double encoding the mouse button pressure. The pressure value may range from 0 to 1.0, with 0 representing the mouse being up. This value is commonly set by tablet pens mimicking a mouse.
kCGMouseEventButtonNumber
    Key associated with an integer representing the mouse button number. The left mouse button reports as button 0. A right mouse button reports as button 1. A middle button reports as button 2 and additional buttons report as the appropriate USB button.
kCGMouseEventDeltaX
kCGMouseEventDeltaY
    Key associated with an integer encoding the mouse delta since the last mouse movement event.
kCGMouseEventInstantMouser
    Key associated with an integer value, non-zero if the event should be ignored by the Inkwell subsystem.
kCGMouseEventSubtype
    Key associated with an integer encoding the mouse event subtype as a kCFNumberIntType.
    enum CGEventMouseSubtype {
    kCGEventMouseSubtypeDefault=0,
    kCGEventMouseSubtypeTabletPoint=1,
    kCGEventMouseSubtypeTabletProximity=2
    };

Tablets may generate specially annotated mouse events, which will contain additional keys and values. Mouse events of subtype CGEventMouseSubtypeTabletPoint may also use the tablet accessor keys. Mouse events of subtype kCGEventMouseSubtypeTabletProximity may also use the tablet proximity accessor keys.

Additional keys and values found in keyboard events include the following.

kCGKeyboardEventAutorepeat
    Key associated with an integer, non-zero when this is an autorepeat of a key-down, and zero otherwise.
kCGKeyboardEventKeycode
    Key associated with the integer virtual keycode of the key-down or key-up event.
kCGKeyboardEventKeyboardType
    Key associated with the integer representing the keyboard type identifier.

Additional keys and values found in scroll wheel events include the following.

kCGScrollWheelDeltaAxis1
kCGScrollWheelDeltaAxis2
kCGScrollWheelDeltaAxis3
    Key associated with an integer value representing a change in scrollwheel position.
kCGScrollWheelEventInstantMouser
Key associated with an integer value, non-zero if the event should be ignored by the Inkwell subsystem.

Additional keys and values found in tablet pointer events, and in mouse events containing embedded tablet event data include the following.

kCGTabletEventPointX
kCGTabletEventPointY
kCGTabletEventPointZ
    Key associated with an integer encoding the absolute X, Y, or Z tablet coordinate in tablet space at full tablet resolution.
kCGTabletEventPointButtons
    Key associated with an integer encoding the tablet button state as a kCFNumberLongType. Bit 0 is the first button, and a set bit represents a closed or pressed button.
kCGTabletEventPointPressure
    Key associated with a double encoding the tablet pen pressure. 0 represents no pressure, and 1.0 represents maximum pressure.
kCGTabletEventTiltX
kCGTabletEventTiltY
    Key associated with a double encoding the tablet pen tilt. 0 represents no tilt, and 1.0 represents maximum tilt.
kCGTabletEventRotation
    Key associated with a double encoding the tablet pen rotation.
kCGTabletEventTangentialPressure
    Key associated with a double encoding the tangential pressure on the device. 0 represents no pressure, and 1.0 represents maximum pressure.
kCGTabletEventDeviceID
    Key associated with an integer encoding the system-assigned unique device ID.
kCGTabletEventVendor1
kCGTabletEventVendor2
kCGTabletEventVendor3
    Key associated with an integer containing vendor-specified values.

Additional keys and values found in tablet proximity events, and in mouse events containing embedded tablet proximity data:

kCGTabletProximityEventVendorID
    Key associated with an integer encoding the vendor-defined ID, typically the USB vendor ID.
kCGTabletProximityEventTabletID
    Key associated with an integer encoding the vendor-defined tablet ID, typically the USB product ID.
kCGTabletProximityEventPointerID
    Key associated with an integer encoding the vendor-defined ID of the pointing device.
kCGTabletProximityEventDeviceID
    Key associated with an integer encoding the system-assigned device ID.
kCGTabletProximityEventSystemTabletID
    Key associated with an integer encoding the system-assigned unique tablet ID.
kCGTabletProximityEventVendorPointerType
    Key associated with an integer encoding the vendor-assigned pointer type.
kCGTabletProximityEventVendorPointerSerialNumber
    Key associated with an integer encoding the vendor-defined pointer serial number.
kCGTabletProximityEventVendorUniqueID
    Key associated with an integer encoding the vendor-defined unique ID.
kCGTabletProximityEventCapabilityMask
    Key associated with an integer encoding the device capabilities mask.
kCGTabletProximityEventPointerType
    Key associated with an integer encoding the pointer type.
kCGTabletProximityEventEnterProximity
    Key associated with an integer, non-zero when pen is in proximity to the tablet, and zero when leaving the tablet.

Registering an Event Tap: A function registers an event tap, taking a pointer to the program's tap function (also referred to as a callback routine or function) and an arbitrary reference to be passed to the tap function, and returning a CFMachPortRef the program can add to the appropriate run loop using CFRunLoopAddSource( ). Taps may be placed at the point where HIDSystem events enter the server, at the point where HIDSystem and remote control events enter a session, at the point where events have been annotated to flow to a specific application, or at the point where events are delivered to the application. Taps may be inserted at a specified point at the head of pre-existing filters, or appended after any pre-existing filters. Taps may be passive event listeners, or active filters. An active filter may pass an event through unmodified, modify an event, or discard an event. When a tap is registered, it identifies the set of events to be observed with a mask, and indicates if it is a passive or active event filter. Multiple event type bitmasks may be OR'ed together. Releasing the CFMachPortRef will release the tap. The CGEventTapProxy is an opaque reference to state within the client application associated with the tap. The tap function may pass this reference to other functions, such as the event-posting routines.

```
/* Possible tapping points for events */
typedef enum {
    kCGHIDEventTap,
    kCGSessionEventTap,
    kCGAnnotatedSessionEventTap}
} CGEventTap;
typedef enum {
    kCGHeadInsertEventTap,
    kCGTailAppendEventTap}
} CGEventTapPlacement;
enum {
    kCGEventTapOptionListenOnly=0x00000001
};
typedef uint32_t CGEventTapOptions;
#define    CGEventMaskBit(eventType)   (1ULL<<(eventType))
typedef uint64_t CGEventMask;
typedef void * CGEventTapProxy;
/*
 * The callback is passed a proxy for the tap, the event type, the
 * incoming event, and the refcon the callback was registered with.
 * The function should return the (possibly modified) passed in event,
 * a newly constructed event, or NULL if the event is to be deleted.
 * The CGEventRef passed into the callback is retained by the calling
 * code, and is released after the callback returns and the data is
 * passed back to the event system. If a different event is returned
 * by the callback function, then that event will be released by the
 * calling code along with the original event, after the event data
 * has been passed back to the event system.
 * If an event tap is set to be listen-only, then the returned value,
 * if not NULL, is released without being passed back to the event
 * system.
 */
typedef void (*CGEventTapCallBack)(CGEventTapProxy proxy,
    CGEventType type, CGEventRef event,
    void *refcon, CGEventRef *pEventOut);
/* Return the a CFMachPortRef for the event tap. */
CG_EXTERN CFMachPortRef CGEventTapCreate(CGEventLocation tap,
    CGEventTapPlacement place,
    CGEventTapOptions options,
    CGEventMask eventsOfInterest,
    CGEventTapCallBack callback,
    void * refcon);
```

Events being routed to individual applications may be tapped using another function. CGEventTapCreateForPSN( ) will report all events being routed to the specified application.

```
/* Return the CFMachPortRef for an event tap for the specified
 * process. */
#include <HIServices/Processes.h>
CG_EXTERN CFMachPortRef CGEventTapCreateForPSN
    (ProcessSerialNumber *psn,
    CGEventTapPlacement place,
    CGEventTapOptions options,
    CGEventMask eventsOfInterest,
    CGEventTapCallBack callback,
    void * refcon);
```

Posting New Events: A function to post events from a tap is provided. The events are posted to the same points that an event returned from an event tap would be posted to. If an event tap posts new events, the new events enter the system before the event returned by the tap enters the system. This order may be changed by explicitly posting the filtered event along with new events in the desired order, and then returning NULL from the callback. Events posted into the system will be seen by all taps placed after the tap posting the event.
/* Post an event from the event tap into the event stream. */
CG_EXTERN void CGEventTapPostEvent(CGEventTapProxy proxy,
    CGEventRef event);
Functions to post events into the system at various points are provided. Each event posted by these functions enters the system at a point immediately before any taps instantiated for that point, and will passthrough any such taps. This mechanism permits an external process to establish an event routing policy, for example, by tapping events at the kCGAnnotatedSessionEventTap and then posting the events to the desired PSN.
/* Post an event from the event tap into the event stream. */
CG_EXTERN void CGPostEvent(CGEventTapLocation tap,
    CGEventRef event);
/* Post an event from the event tap into the event stream
 * for a specific application. */
CG_EXTERN void CGPostEventToPSN(ProcessSerialNumber *psn,
    CGEventRef event);
Typical Usage as an Event Monitor: This sample code demonstrates the use of this API in the context of a simple event monitor.
include <ApplicationServices/ApplicationServices.h>
include <stdlib.h>
include <unistd.h>
static const char * eventType[ ]=
{
"NullEvent", "LMouseDown", "LMouseUp", "RMouseDown", "RMouseUp",
"MouseMoved", "LMouseDragged", "RMouseDragged", "MouseEntered",
"MouseExited", "KeyDown", "KeyUp", "FlagsChanged", "Kitdefined",
"SysDefined", "AppDefined", "Timer", "CursorUpdate",
"Journaling", "Suspend", "Resume", "Notification",
"ScrollWheel", "TabletPointer", "TabletProximity",
"OtherMouseDown", "OtherMouseUp", "OtherMouseDragged"
};
static CGEventRef eventCallback(CGEventTapProxy proxy,
    CGEventType type, CGEventRef event,
    void *refcon)
{
    if (type <(sizeof eventType/sizeof eventType[0]))
        printf("% s\n", eventType[type]);
    else
        printf("Event Type 0x % x\n", type);
    return NULL;
}int
main( )
{
    CFMachPortRef eventPort;
    CFRunLoopSourceRef eventSrc;
    CFRunLoopRef runLoop;
    runLoop=CFRunLoopGetCurrent( )
    if (runLoop==NULL)
        printf("No run loop?\n");
    /*
     * Create an event tap.
     * The tap listens for annotated session events, the
     * last tap point before events are sent to applications.
     */
    eventPort=CGCreateEventTap(kCGAnnotatedSessionEventTap,
        kCGHeadInsertEventTap,
        kCGEventTapOptionListenOnly,
        kCGEventMaskForAllEvents,
        eventCallback,
        NULL);
    if (eventPort==NULL)
    {
        printf("NULL event port\n");
        exit(1);
    }
    /* Make an event source for our event tap port */
    eventSrc=CFMachPortCreateRunLoopSource(NULL,
        eventPort, 0);
    if (eventPort==NULL)
        printf("No event run loop src?\n");
    /* Listen for events on our event tap port */CFRunLoopAddSource(runLoop, eventSrc, kCFRunLoopDefaultMode);
    /* Go log events. Never returns. */
    CFRunLoopRun( )
    exit(0);
    return 0;

What is claimed is:

1. A programmable processing device including:
a processor;
a user interface event application programming interface (API) on the processor, the API comprising:
a function allowing a user to register each of a plurality of event processing routines within a window server application executing on the programmable processing device, wherein each event processing routine
    is registered at a specified one of a plurality of user interface event taps within the window server application executing on the programmable processing device,
    is associated with a specified user interface event type,
    is not associated with a specific application being presented by the window server application, and
    is invoked for execution by the window server application when an event of the associated user interface event type is received by the window server application at the specified one of a plurality of user interface event taps prior to notifying one or more applications being presented by the window server application that the specified user interface event type was received by the window server application.

2. The programmable processing device user interface event API of claim 1, wherein the event processing routine comprises a passive callback function.

3. The programmable processing device user interface event API of claim 1, wherein event processing routine comprises an active callback function.

4. The programmable processing device user interface event API of claim 3, further comprising a set of functions to permit the active callback routine to modify the event that caused the active callback function to be invoked.

5. The programmable processing device user interface event API of claim 4, wherein the set of functions to modify comprise functions to change a type attribute associated with the event that caused the active callback function to be invoked.

6. The programmable processing device user interface event API of claim 4, wherein the set of functions to modify comprise functions to delete the event that caused the active callback function to be invoked.

7. The programmable processing device user interface event API of claim 4, wherein the set of functions to modify comprise functions to create one or more additional events associated with the event that caused the active callback function to be invoked.

8. The programmable processing device user interface event API of claim 1, wherein the window server application comprises two or more cooperatively executing applications.

9. The programmable processing device user interface event API of claim 1, wherein the specified user interface event type comprises one of a human interface device event, a session event, an annotated session event or a connection event.

10. A program storage device comprising instructions stored thereon and readable by a programmable control device, the instructions embodying the user interface event application programming interface (API) of claim 1.

11. A computer system, comprising:
- a display device;
- one or more input devices;
- a processor operatively coupled to the display and input devices; and
- memory operatively coupled to the processor, input and display devices, said memory adapted to store instructions embodying the user interface event application programming interface (API) of claim 1.

* * * * *

UNITED STATES PATENT AND TRADEMARK OFFICE
CERTIFICATE OF CORRECTION

PATENT NO. : 7,818,755 B1
APPLICATION NO. : 11/020875
DATED : October 19, 2010
INVENTOR(S) : Michael James Paquette It is certified that error appears in the above-identified patent and that said Letters Patent is hereby corrected as shown below:

On the Title page, in field (56), under "Other Publications", in column 2, line 4, delete "Librafy" and insert -- Library --, therefor.

In column 3, line 51, delete "Os®" and insert -- OS® --, therefor.

In column 3, line 58, delete "illustrated-in" and insert -- illustrated in --, therefor.

In column 7, lines 13-46, below "mouseButton);"
delete "/* Return the CFTypeID for CGEventRefs. */ CG_EXTERN CFTypeID CGEventGetTypeID(void);
This API provides the ability to create a NULL event, or to create specialized events reflecting a state specified as parameters to the creation functions.
/* Create a NULL event to be filled in. 'source' may be NULL. */
CG_EXTERN CGEventRef CGEventCreate(CGEventSource source);
/*
* Create mouse events.
* The event source may be taken from another event, or may be
* NULL. mouseType should be one of the mouse event types.
* mouseCursorPosition should be the global coordinates the mouse
* is at for the event. For kCGEventOtherMouseDown,
* kCGEventOtherMouseDragged, and kCGEventOtherMouseUp events,
* the mouseButton parameter should indicate which button is
* changing state.
* The current implementation of the event system supports a
* maximum of thirty-two buttons. Mouse button 0 is the primary
* button on the mouse. Mouse button 1 is the secondary
* mouse button (right). Mouse button 2 is the center button, and
* the remaining buttons would be in USB device order.
*/

Signed and Sealed this
Twenty-second Day of November, 2011

David J. Kappos
*Director of the United States Patent and Trademark Office*

CERTIFICATE OF CORRECTION (continued)
U.S. Pat. No. 7,818,755 B1

CG_EXTERN CGEventRef CGCreateMouseEvent(CGEventSource source, CGEventType mouseType, CGPoint mouseCursorPosition, CGButtonCount mouseButton);"

In column 8, line 1, delete ""shift" and insert -- shift --, therefor.

In column 8, line 31, after "event" insert -- */ --.

In column 8, line 53, delete "}CGEventType;" and insert -- } CGEventType; --, therefor.

In column 9, line 44, delete "kCGMouseEventPres sure" and insert -- kCGMouseEventPressure --, therefor.

In column 11, line 62, delete "kCGAnnotatedSessionEventTap}" and insert -- kCGAnnotatedSessionEventTap --, therefor.

In column 11, line 66, delete "kCGTailAppendEventTap}" and insert -- kCGTailAppendEventTap --, therefor.

In column 12, line 5, delete "(1ULL" and insert -- (NULL --, therefor.

In column 13, line 60, after "Current ( )" insert -- ; --.

In column 14, lines 18-20, after "port */" delete "CFRunLoopAddSource(runLoop, eventSrc, kCFRunLoopDefaultMode);" and insert the same on Line 19, Col. 14 as a new paragraph.

In column 14, line 22, after "CFRunLoopRun( )" insert -- ; --.

In column 14, line 24, below "return 0;" insert -- } --.

In column 14, line 49-50, in Claim 2, after "device" delete "user interface event API".

In column 14, lines 52-53, in Claim 3, after "device" delete "user interface event API".

In column 14, lines 55-56, in Claim 4, after "device" delete "user interface event API".

In column 14, lines 59-60, in Claim 5, after "device" delete "user interface event API".

In column 14, lines 64-65, in Claim 6, after "device" delete "user interface event API".

In column 15, lines 1-2, in Claim 7, after "device" delete "user interface event API".

In column 15, lines 6-7, in Claim 8, after "device" delete "user interface event API".

In column 15, lines 10-11, in Claim 9, after "device" delete "user interface event API".